United States Patent
Hermann, Jr.

(10) Patent No.: US 8,364,576 B2
(45) Date of Patent: Jan. 29, 2013

(54) TRADABLE INVESTMENT UNIT

(76) Inventor: William J. Hermann, Jr., Sealy, TX (US)

( * ) Notice: Subject to any disclaimer, the term of this patent is extended or adjusted under 35 U.S.C. 154(b) by 13 days.

(21) Appl. No.: 12/958,519

(22) Filed: Dec. 2, 2010

(65) Prior Publication Data

US 2011/0131129 A1    Jun. 2, 2011

Related U.S. Application Data

(60) Provisional application No. 61/265,788, filed on Dec. 2, 2009.

(51) Int. Cl.
*G06Q 40/00* (2006.01)

(52) U.S. Cl. ............. 705/37; 705/36 R; 705/38; 705/39; 705/40; 705/41; 705/42

(58) Field of Classification Search ........... 705/1, 25–42
See application file for complete search history.

(56) References Cited

U.S. PATENT DOCUMENTS 7,212,997 B1 *  5/2007  Pine et al. ................... 705/36 R

* cited by examiner

*Primary Examiner* — Daniel Felten
(74) *Attorney, Agent, or Firm* — Strasburger & Price, LLP

(57) ABSTRACT

A tradable investment unit is an inseparable combination of a predetermined quantity of a tradable security together with a put option contract for the predetermined quantity of the tradable security. The combination will specify the minimum price and thereby the maximum potential loss of the tradable investment unit to purchasers. The profit potential will be unlimited as the price of the tradable security increases above the cost of the tradable investment unit.

11 Claims, 2 Drawing Sheets

TRADABLE INVESTMENT UNIT

CROSS REFERENCE TO RELATED APPLICATION

Figure 1:
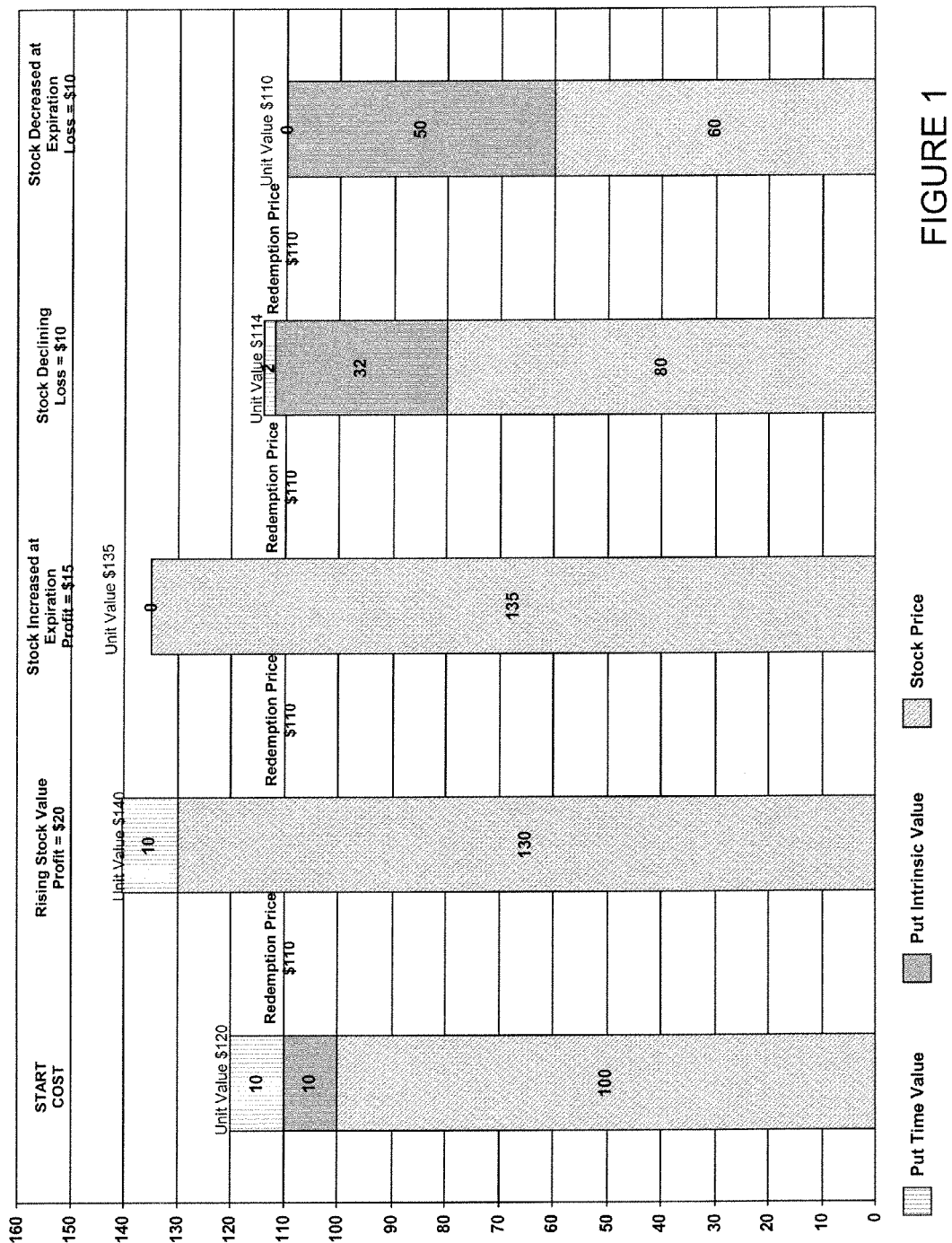

This application claims the benefit of Provisional U.S. Patent Application No. 61/265,788 filed Dec. 2, 2009.

STATEMENT REGARDING FEDERALLY FUNDED RESEARCH AND DEVELOPMENT

The invention described in this patent application was not the subject of federally sponsored research or development.

FIELD

The disclosed invention is a tradable investment unit. More particularly, the disclosed invention is a tradable investment unit which provides the advantages of a pre-defined risk/loss and an unlimited profit/gain potential above the initial/issuing cost.

BACKGROUND

A tradable security is commonly defined as a document which provides written evidence of ownership or creditorship. The most common form of tradable security is a share of stock. A share of stock represents an ownership interest in a business. The value of a share of stock rises and falls over time depending on both the success or lack thereof of the underlying business and a variety of market forces.

Other well-known tradable securities are shares in an exchange traded fund, a debt obligation, or a commodity. The common characteristics among these tradable securities is that they are made available to investors for either purchase or sale.

A derivative of a share of stock is an option contract. Option contracts are another form of tradable security. The origin of the option contract can be found in the markets for trading commodities; particularly, agricultural commodities. Specifically, to provide some predictability for the farmers who raised crops to be sold in the future on the open market, the concept of an option contract came into being as a method of reducing risk for the farmers. Thus, by the use of option contracts farmers could count on the expectation of receiving a predetermined price for a predetermined quantity of a crop at a predetermined time in the future.

The present invention also involves the use of option contracts. The option contracts used in the present invention relate to the underlying tradable security. Not all tradable securities have associated option contracts. An option contract is a promise to either buy or to sell a defined quantity of an underlying tradable security at predetermined price at a predetermined future time. The contractual promise either to buy or to sell the defined quantity of an underlying tradable security at a predetermined price, called the strike price, by a predetermined time has its own value separate and apart from the inherent value of the underlying tradable security. Such option contracts are traded at prices which rise and fall over time in option contract markets where purchasers may buy and sellers may sell option contracts.

Those knowledgeable in option contracts understand that there are two types of option contracts: a call option contract and a put option contract. In a call option contract, the offeror of the call option contract receives money for his promise to be called out by the owner of call option contract to sell to the owner of the call option contract a tradable security at a predetermined date sometime in the future. For example, if a stock is trading at $15 in June, a seller of a call option contract will receive money for selling his call option contract which represents the seller's promise to sell to the buyer of the call option contract the underlying stock for a $20 strike price at a predetermined date in July. The buyer of the call option contract believes that the value of the stock will go to $30 in July; therefore, having the right to buy the stock at $20 or $10 less than the market price before a predetermined date in July will be valuable. Thus, the buyer of the call option contract believes that it is worth the cost of the call option contract to lock in a future purchase price for a tradable security.

If the price of a share of the stock on the open market increases, the owner of the call option contract will effectively call the seller of the call option contract with a demand or a call out of the seller of the call option contract to purchase the predetermined number of shares of stock (typically 100 shares) at the agreed upon strike price in the call option contract before the call option contract expires. If however, the agreed upon strike price for the purchase of the stock by the buyer of the call option contract is lower than the stock is presently trading, then the call option contract has no value. If the value of the underlying stock never increases beyond the strike price, then the call option contract will eventually expire worthless and the seller of the call option contract keeps the money paid to the seller of the call option contract by the buyer of the call option contract.

A put option contract is typically used when the buyer of a put option contract believes that the price of the underlying tradable security may decrease. Thus, the buyer of a put option contract has spent money to purchase the right to put a contractual obligation to the seller of tradable security to sell a predetermined number of stock shares of the underlying security at the strike price of the put option contract so that the underlying security will be purchased by the seller of a put option contract at a predetermined strike price even if the price of the tradable security falls below the strike price in the put option contract.

If the price of the underlying security increases instead of decreases there is no reason to put the put option contract to one agreeing to buy the underlying security at a predetermined strike price as a better price can be obtained for the underlying security by selling the underlying tradable security on the open market. Accordingly, if the price of the underlying security goes up the put option contract will eventually expire worthless.

Some owners of tradable securities see a put option contract as a form of insurance. That is, if the owner of a tradable security has purchased the right to put the tradable security to a buyer who is contractually obligated to buy the underlying tradable security at a predetermined strike price according to the put option contract, the owner of the put option contract has a price floor beneath which the worth of the underlying tradable security to the owner of the tradable security will not fall.

The basic purpose for purchasing and selling tradable securities is to exchange cash today for something that will have a greater value in the future. At some future time, it is anticipated that selling the tradable security at a higher price will produce more cash than what was originally paid. Thus, if one buys a tradable security at a particular price, one hopes to sell that tradable security at a higher price sometime later in time. If one sells and receives cash for selling an option contract, one hopes that the option contract will either expire worthless or that it will be possible to either buy back the option contract at a lower price in the future and pocket the difference in price.

The difference between the purchase price of a tradable security and a higher sale price later in time is profit. The difference between the purchase price of a tradable security and a lower sale price later in time is a loss. Some tradable securities go up substantially in price and produce large amounts of profit for their owners. Others do not. The difference between either the profit or loss over time in the value of a tradable security is attributed to the risk associated with the tradable security. High risk tradable securities have the potential of producing large profits over time; but high risk tradable securities also have the potential of producing large losses over time. Tradable securities are selected by purchasers based on the perceived risk associated with the probabilities that the future price of the tradable security which reach a level higher than what was paid for the tradable security.

For those interested in making money in the purchase and sale of tradable securities, there remains a continuing search for tradable securities, option contracts on tradable securities, or a combination of tradable securities and option contracts on tradable securities which minimize both risk, and maximize profit potential.

SUMMARY

The present invention minimizes risk and maximizes profit potential. Specifically, the present invention is a tradable investment unit. The disclosed tradable investment unit of the present invention is an inseparable combination of an underlying tradable security and a put option contract. The inseparable tradable security and put option contract remain fixed together as a tradable investment unit.

Instead of the underlying tradable security and the associated put option contract being traded separately, the underlying tradable security and the put option contract remain permanently fixed together. Keeping the underlying tradable security and the put option contract together as a tradable investment unit minimizes the risk of loss and maximizes the potential profit for the owner of the inseparable combination of the underlying tradable security and the put option contract.

Purchasers of the tradable unit investment of the present invention will have their maximum potential loss limited and predefined. The tradable investment unit is bought at an initial/issuing price called the unit value. The maximum potential loss will be defined by the minimum price which is called the redemption price or face value of the disclosed tradable unit investment. This is because the put option contract will provide the right to sell the underlying tradable security at a predetermined price no matter how low the price of the underlying tradable security falls on the market in which it trades. This maximum potential loss will be stated as a minimum price, redemption price or a face value. The minimum price, redemption price or face value of the tradable unit investment vehicle of the present invention will be set to be substantially equal to the strike price of the put option contract associated with the underlying tradable security.

DESCRIPTION OF THE DRAWING FIGURE

Figure 2:
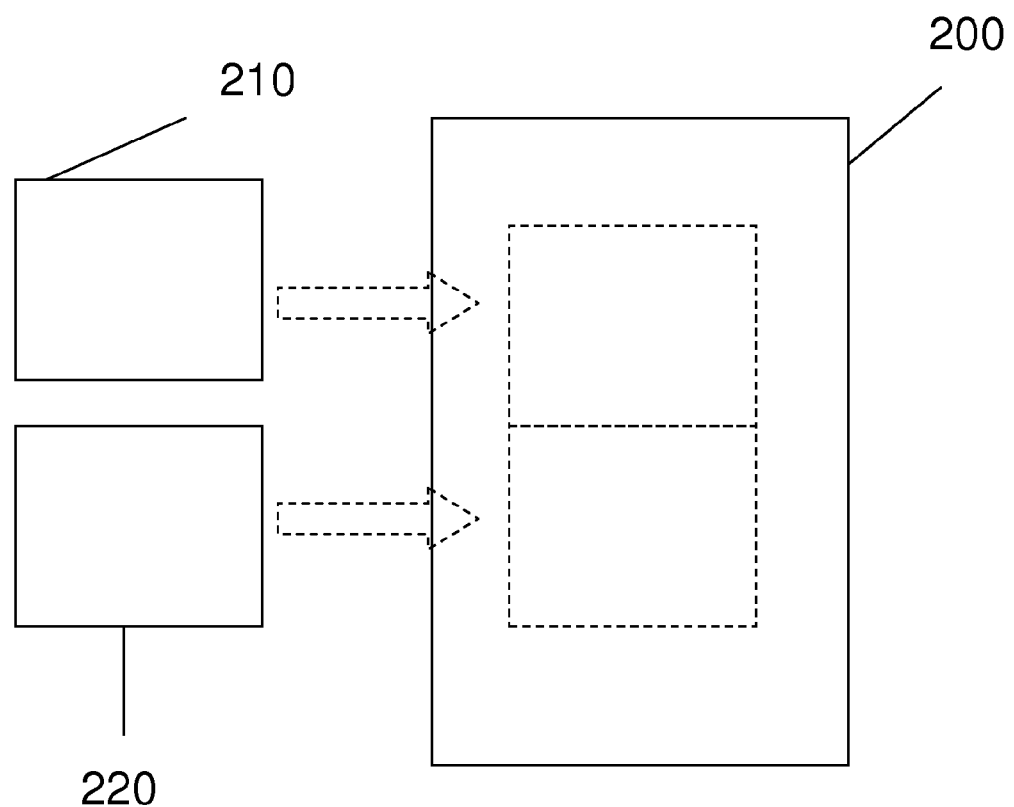

A still better understanding of the tradable investment unit of the present invention may be had from the following drawing figure, wherein:

FIG. 1 is a bar graph illustrating the unit value and the redemption price of the tradable investment unit of the present invention under different market conditions; and FIG. 2 is a diagram of the tradable investment unit according to one embodiment of the disclosure.

DESCRIPTION OF THE EMBODIMENTS

The initial/issuing cost or unit value of the tradable investment unit of the present invention will be no more than about 10% above the minimum/redemption value of the tradable investment unit. For example, as shown in FIG. 1, if the price of 100 shares of WJT stock is $100, the initial unit value of the disclosed tradable investment unit having a redemption value of $110 will be about $120. The $20 difference from the price of the underlying stock accounts for both the intrinsic value of the put option contract and the time value of the put option contract.

As shown in FIG. 2, each tradable investment unit 200 will include:

(1) a fixed amount 210, for example 100 shares or multiples of 100 shares of an equity or stock, a debt obligation, a commodity, or any security wherein put option contracts for 100 shares of the stock, commodity or security are available and tradable through an options exchange; and (2) a put option contract 220 on the fixed amount of the shares of an equity or stock, a debt obligation, commodity or security. For example, 100 shares of the equity or stock, or the debt obligation, the commodity, or the security is a standard fixed amount. The strike price of the put option contract on WJT stock is such that the maximum loss will be limited and specified on the tradable investment unit for predetermined time period, typically one to two years, and stated as a minimum/redemption/face value which is set at the strike price of the put option contract. For example, as shown in FIG. 1, if the strike price of the put option contract is $80, the put option contract on WJT stock will always allow the owner of the tradable investment unit of the present invention to sell the 100 units of the tradable security, the WJT stock, for $80 per share no matter what price the shares of WJT stock may be selling for in the open market.

A still better understanding of the tradable investment units of the present invention may be had by further reference to FIG. 1.

The second bar graph from the left illustrates a rising stock value. The price of WJT stock has increased over time to $130. As the price of the WJT stock moves farther above the $120 price paid for the tradable investment unit, the value of the tradable investment unit rises in the usual sense of accumulating profit. Because of the passage of time and the increased stock price the value of the put option contract is all in its time value of $10 with several months to expiration.

As shown in the third bar graph from the left, at the expiration of the put option contract, the $10 time value of the put option contract will become zero if the stock stays above the redemption price of $110. Thus, when the put option contract expires, the only remaining value of the tradable investment unit is the value of the underlying stock or $135.

The fourth bar graph from the left illustrates what happens in a declining market. In the fourth bar graph from the left the price of the WJT stock is shown to be decreasing over time in a declining market. As the price of the stock approaches the $80 strike price of the put option contract, the unit value of the tradable investment unit decreases from its initial/issuing price of $120 to $114. The $114 is the sum of the stock price of $80, the intrinsic $32 value of the put option contract and the $2 time value of the put option contract.

Then as the price of the WJT stock falls below the $80 strike price of the put option contract as shown in fifth bar graph from the left the value of the tradable investment unit remains at $110 or $10 below its purchase price. The fifth bar graph shows that the $110 redemption price of the tradable investment unit is the sum of the stock price of $60 and the $50 intrinsic value of the put option contract. Accordingly, the maximum loss will be limited by a minimum specified redemption value for the tradable investment unit defined by the strike price of the put option contract.

It is anticipated that the tradable investment unit having a minimum or redemption face value may be used as security, in the sense of margin, such that a call or put option contract on the specific underlying tradable security represented in the tradable investment unit could be sold as a "covered" transaction. If such a transaction lead to a call for the stock or a demand to buy the stock by the exercise of the right represented by the sold put option contract then the tradable unit would be sold and the exercise right met.

The initial/issuing price of the tradable investment unit consists of the price of the underlying equity, exchange traded fund (ETF), debt obligation, call option contract or commodity future contract; the price of the put option contract, which typically includes an intrinsic value, or the amount the strike price is above the current price of the security, and a time value; and, potentially a fee assigned by the issuer of the tradable investment unit. Further, when the value of the underlying security rises above the combined cost/price of the tradable investment unit, the tradable investment unit will traded at a price consisting of the current higher value of the underlying security plus the residual time value of the put option contract. Implicit in the latter is that at expiration of the tradable investment unit, coincident with the expiration of the put option contract in the tradable investment unit, if the value of the underlying security is above the minimum redemption price (the strike price of the put option contract) then the value of the tradable investment unit will be the value of the underlying security alone. At expiration, the issuer of the tradable investment unit shall deliver the cash value at closing on the expiration date or the underlying security itself to the final holder of the tradable investment unit.

Further it is anticipated that the underlying security in the tradable investment unit may be a call option contract whose strike price is below the value of the security it represents and whose expiration is the same as the put option contract in the tradable investment unit. In such case the minimum redemption value would only consist of the sum of the intrinsic values of both the call and put option contracts. Another way to determine the minimum value in such a unit made up of a call and a put option contract is the difference in their strike price assuming the value of the tradable security is between the two strike prices and the strike price of the call option contract is lower than that of the put option contract.

While the present invention has been described according to its preferred embodiment, those of ordinary skill in the art will understand the other embodiments of the present invention will become apparent to those of ordinary skill in the art. Such embodiments shall fall within the scope and meaning of the appended claims.

What is claimed is:

1. A tradable investment unit, said tradable investment unit comprising:
    a tradable financial instrument representing:
    an underlying tradable security; and
    a put option contract associated with said underlying tradable security, wherein the put option contract includes an agreement preventing dissolution of the financial instrument until a selected condition is met.

2. The tradable investment unit as defined in claim 1 wherein said underlying tradable security is a stock.

3. The tradable investment unit as defined in claim 1 wherein said underlying tradable security is an exchange traded fund.

4. The tradable investment unit as defined in claim 1 wherein said underlying tradable security is a debt obligation.

5. The tradable investment unit as defined in claim 1 wherein said underlying tradable security is a commodity.

6. The tradable investment unit as defined in claim 1 wherein said underlying tradable security is a call option contract.

7. The tradable investment unit of claim 1 wherein the underlying security is tradable on a first market and the put option contract is tradable on a second market, and wherein the first market and the second market are not identical.

8. The tradable investment unit of claim 1 wherein the tradable investment unit is tradable on a market that is not identical to a market for trading any of: the underlying tradable security and the put option contract.

9. The tradable investment unit of claim 1 wherein the financial instrument has a minimum redemption value.

10. The tradable investment unit of claim 9 wherein the put option contract has a strike price and the minimum redemption value is based on the strike price.

11. The tradable investment unit of claim 1 wherein the selected condition is an expiration of the put option contract.

* * * * *